W. OSTERHOLM.
WORK FEED FOR STAPLING MACHINES.
APPLICATION FILED JULY 7, 1908.
1,074,559.
Patented Sept. 30, 1913.
6 SHEETS—SHEET 1.
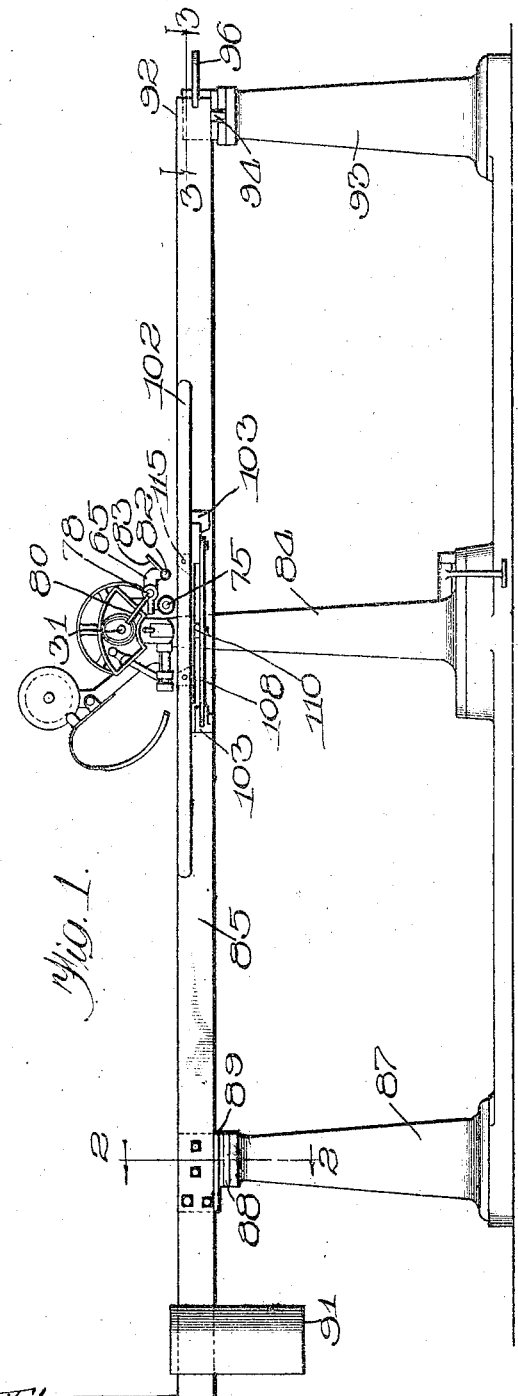
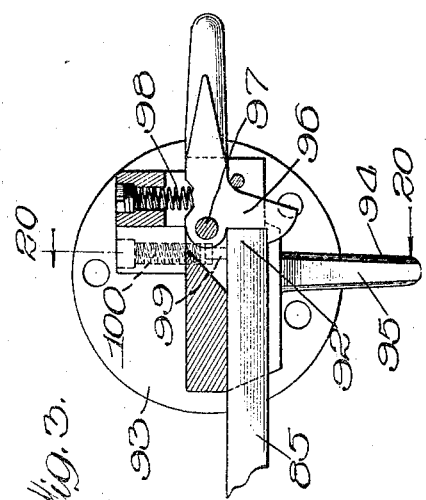
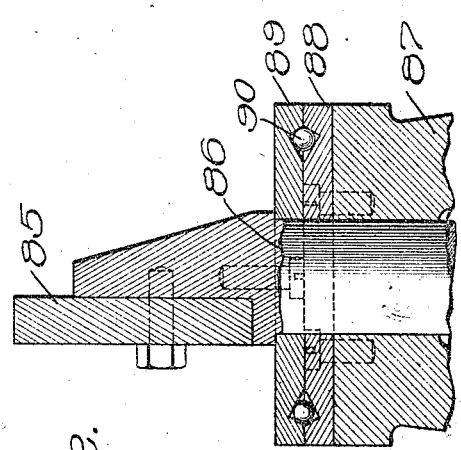

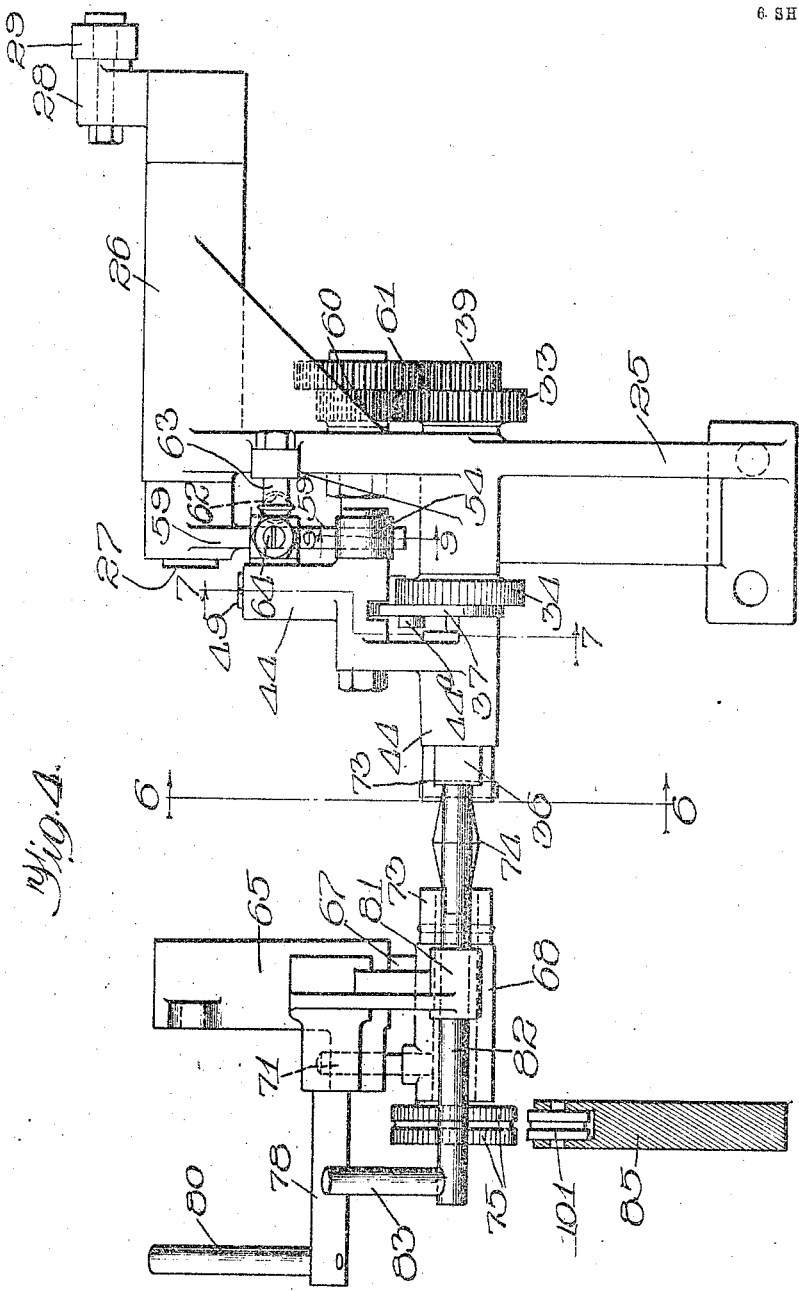

W. OSTERHOLM.
WORK FEED FOR STAPLING MACHINES.
APPLICATION FILED JULY 7, 1908.
1,074,559.
Patented Sept. 30, 1913.
6 SHEETS—SHEET 3.
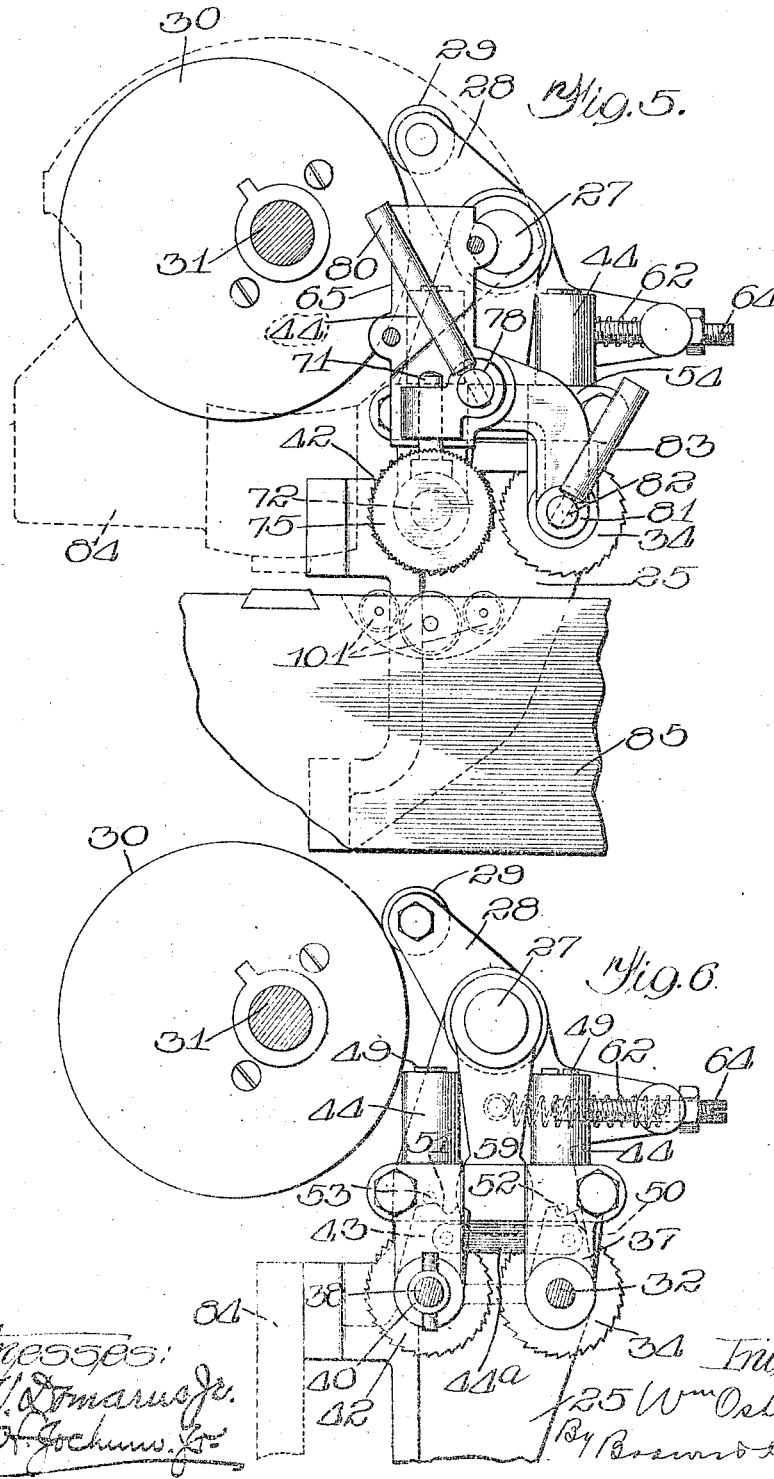

W. OSTERHOLM.
WORK FEED FOR STAPLING MACHINES.
APPLICATION FILED JULY 7, 1908.
1,074,559.
Patented Sept. 30, 1913.
6 SHEETS—SHEET 4.
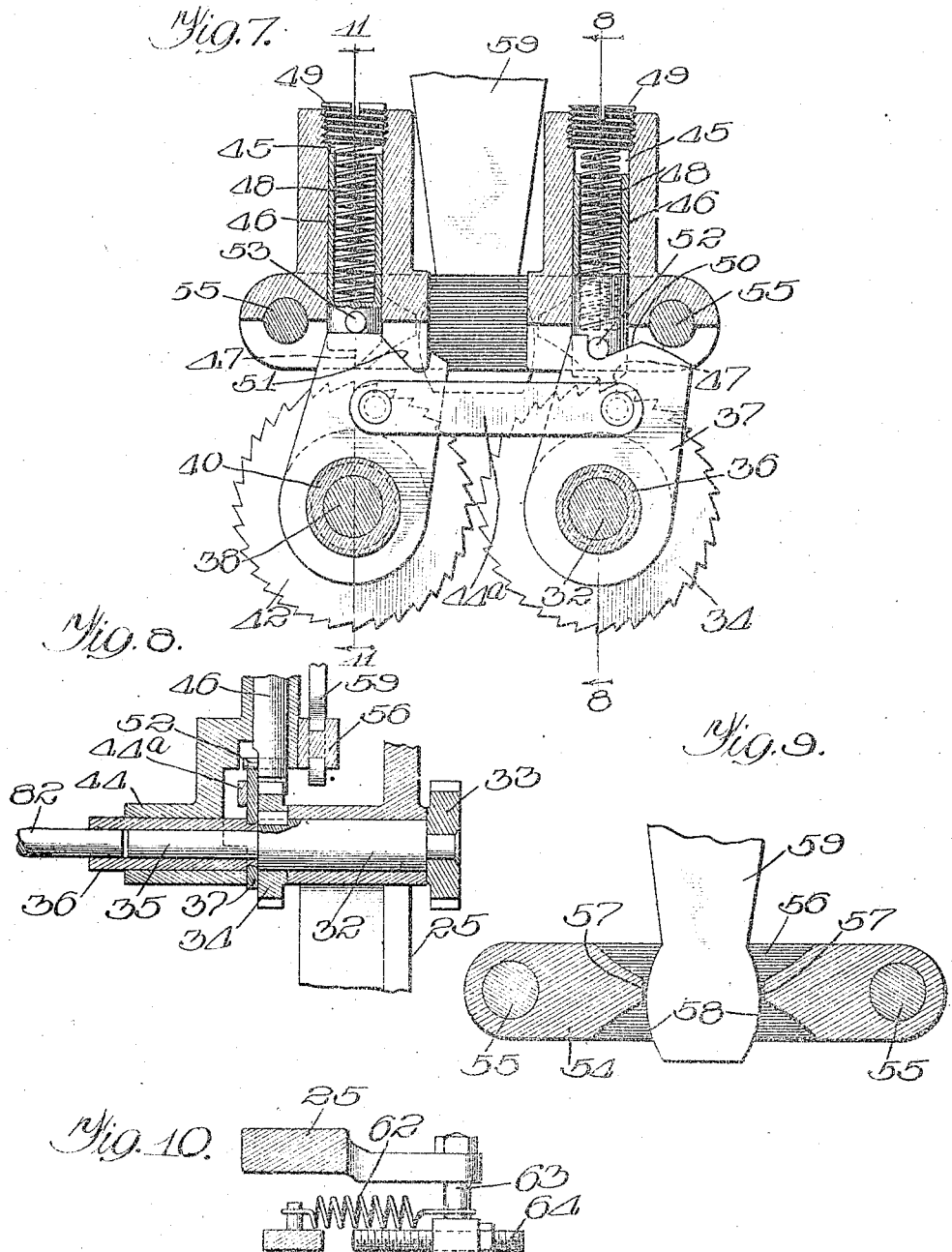

W. OSTERHOLM.
WORK FEED FOR STAPLING MACHINES.
APPLICATION FILED JULY 7, 1908.
1,074,559.
Patented Sept. 30, 1913.
6 SHEETS—SHEET 5.
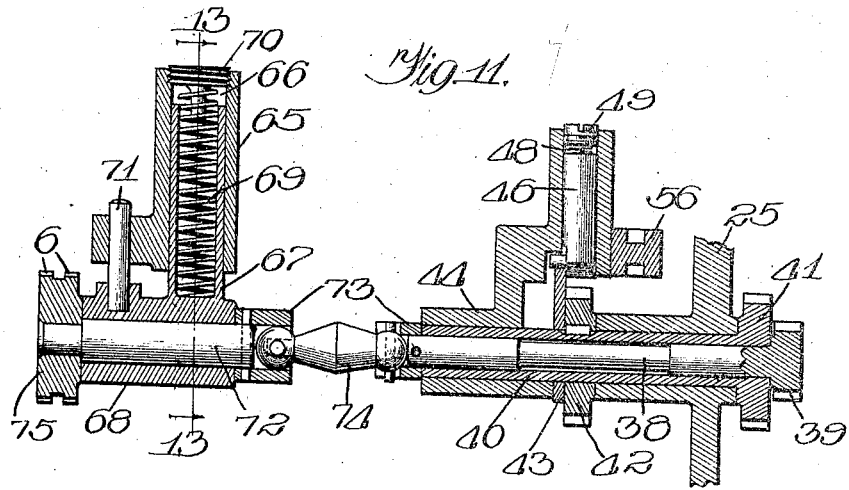
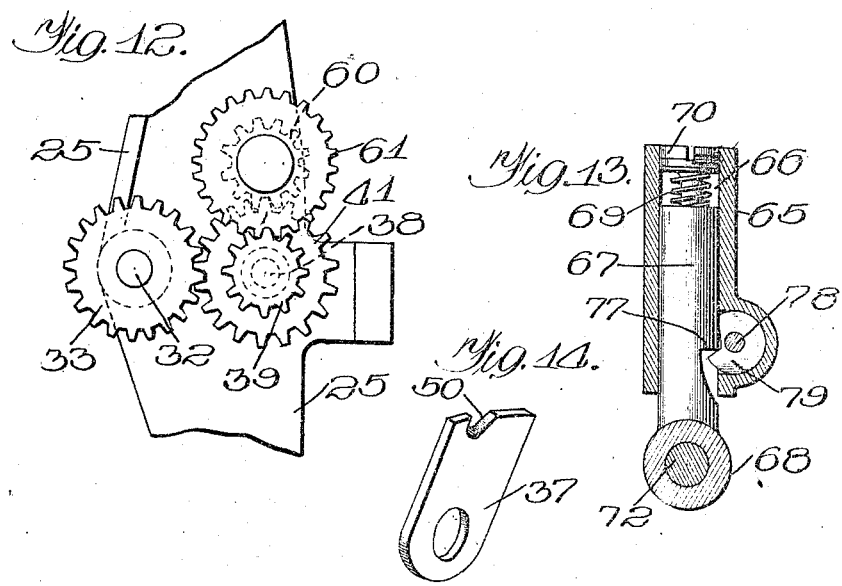
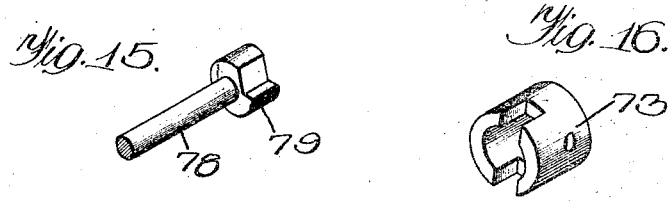
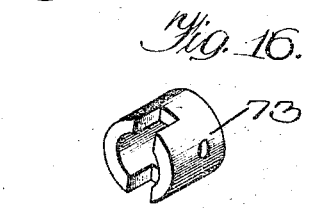
Witnesses:
Inventor:
Wm Osterholm
By Brown & Hoffman
Attys

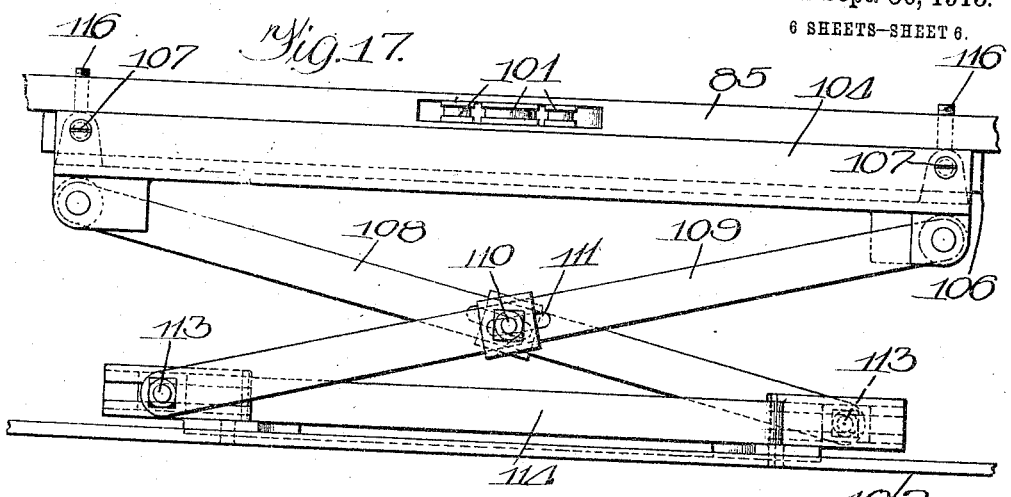
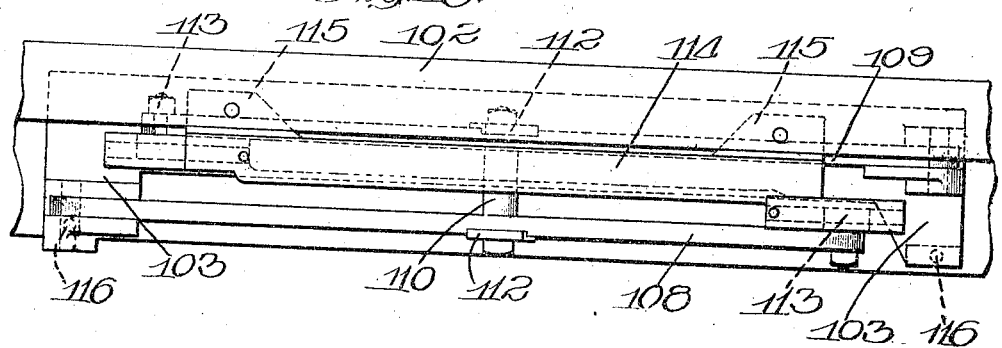
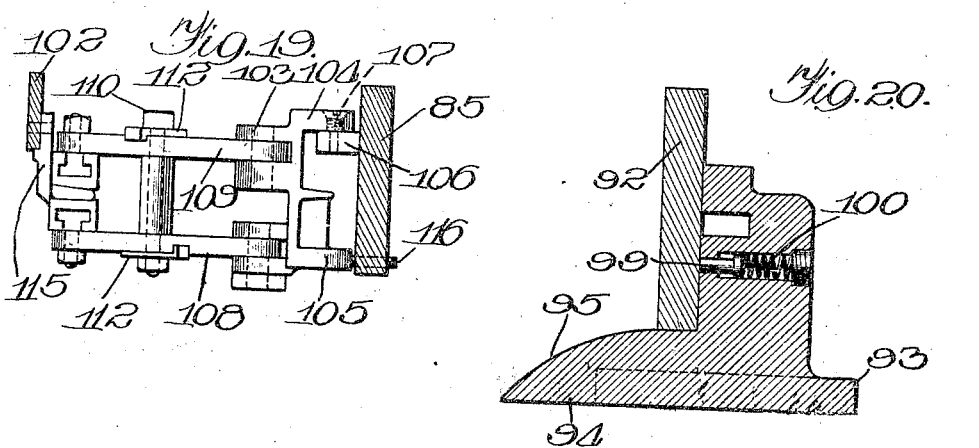

UNITED STATES PATENT OFFICE.

WILLIAM OSTERHOLM, OF CHICAGO, ILLINOIS, ASSIGNOR TO LATHAM MACHINERY COMPANY, OF CHICAGO, ILLINOIS, A CORPORATION OF ILLINOIS.

WORK-FEED FOR STAPLING-MACHINES.

1,074,559.  Specification of Letters Patent.  Patented Sept. 30, 1913.

Application filed July 7, 1908. Serial No. 442,326.

*To all whom it may concern:*

Be it known that I, WILLIAM OSTERHOLM, a citizen of the United States, residing at Chicago, in the county of Cook and State of Illinois, have invented certain new and useful Improvements in Work-Feeds for Stapling-Machines, of which the following is a specification.

This invention relates to improvements in work feeding mechanism for stapling machines, particularly adapted for use in machines for stapling boxes of considerable size and length, and the primary object of the invention is to provide improved means for feeding the work to the stapling mechanism and improved means for reversing the mechanism for feeding the work in the opposite direction.

A further object is to provide improved means for adjusting the feeding mechanism into and out of operative engagement with the work.

A further object is to provide an improved support for the work.

A further object is to provide an improved counterbalancing support for the work and improved means for locking the support in position after the work is placed thereon.

A further object is to provide an improved gage or supplemental support adapted to be secured to the main support to assist in positioning and supporting the work, and improved means for adjusting the gage or supplemental support to accommodate work of different widths.

A further object is to provide an improved device of this character which will be simple and durable in construction and effective and efficient in operation.

To the attainment of these ends and the accomplishment of other new and useful objects as will appear, the invention consists in the features of novelty in the construction, combination and arrangement of the several parts hereinafter more fully described and claimed and shown in the accompanying drawings illustrating an embodiment of the invention, and in which—

Figure 1 is a front elevation partly in diagram of a stapling machine having improvements applied thereto constructed in accordance with the principles of this invention. Fig. 2 is a detail sectional view on line 2—2 of Fig. 1. Fig. 3 is a detail sectional view on line 3—3 of Fig. 1. Fig. 4 is a detail elevation of the feeding mechanism. Fig. 5 is a front elevation of Fig. 4, showing in dotted lines portions of the stapling machine to which this attachment is applied. Fig. 6 is a sectional view on line 6—6 of Fig. 4. Fig. 7 is a sectional view on line 7—7 of Fig. 4. Fig. 8 is a detail sectional view on line 8—8 of Fig. 7. Fig. 9 is a detail sectional view on line 9—9 of Fig. 4. Fig. 10 is a detail view, partly in section, showing the stop for limiting the movement of the operating arm. Fig. 11 is a sectional view on line 11—11 of Fig. 7. Fig. 12 is a detail right hand elevation of Fig. 4, showing the gears when imparting movement to the feeding wheel. Fig. 13 is a detail sectional view on line 13—13 of Fig. 11. Fig. 14 is a detail perspective view of one of the cams for throwing the pawls out of operative position. Fig. 15 is a detail perspective view of the cam for raising the feed wheel out of engagement with the work. Fig. 16 is a detail perspective view of one of the collars forming a portion of the universal connection between the feed wheel and the operating shaft. Fig. 17 is a detail top plan view of the work support and the supplemental support or gage. Fig. 18 is a front elevation of Fig. 17. Fig. 19 is a right hand end elevation of Fig. 17. Fig. 20 is a detail sectional view on line 20—20 of Fig. 3.

Referring more particularly to the drawings, and in the present exemplification of the invention, the numeral 25 designates a suitable support for a portion of the operating mechanism which is adapted to be secured to the frame work of the machine to which this improved feeding mechanism is to be attached, and this support is provided with a bearing 26 in which is journaled a suitable rock shaft 27 secured to one extremity of which is a crank arm 28 having an anti-friction roller 29 journaled thereon. The support 25 is adapted to be secured to the frame of the machine and in such a position that the anti-friction roller 29 on the arm 28 will engage and rest against the periphery of a cam 30 which, in the present exemplification of the invention, is shown as an eccentric secured to a shaft 31 which is adapted to receive its motion from any suitable source.

Journaled in the support 25 and at any suitable point, is a shaft 32 which is provided with a gear 33 on one extremity thereof adjacent one side of the support, and a ratchet wheel 34 secured thereto adjacent the other side of the support. One extremity 35 of the shaft 32 is reduced, as shown more clearly in Fig. 8, and surrounding the said reduced portion is a sleeve 36 which abuts against the shoulder on the shaft formed by the reduced portion adjacent the ratchet 34, and secured to the sleeve 36 is an arm 37.

A similar shaft 38 is provided with a gear 39 on one extremity thereof, and surrounding said shaft 38 is a sleeve 40. The shaft 38 is preferably of a length somewhat greater than the length of the shaft 35, and the sleeve 40 preferably extends for substantially the entire length of the shaft 38. Secured to the extremity of the sleeve 40 adjacent the gear 39 of the shaft 38 is a gear 41 which meshes with the gear 33 on the shaft 32, as shown more clearly in Fig. 12 of the drawings. Secured to the sleeve 40 adjacent the end of the bearing in the support 25 is a ratchet wheel 42 similar to the ratchet 34, and loosely mounted upon the sleeve 40 adjacent the ratchet 42 is an arm 43. These arms 43, 37 are preferably connected by means of a link 44$^a$, through the medium of which both of the arms may be simultaneously adjusted about their respective supports.

Loosely surrounding each of the sleeves 36, 40 are supports 44 which extend above and project over the respective ratchet wheels 34, 42, and these supports are provided with recesses 45 to form housings for ratchet dogs 46, and these dogs are provided with an operating tooth 47 adapted to engage its respective ratchet 34, 42. The dogs are preferably hollow, as shown more clearly in Fig. 7 of the drawings, and elastic members 48, such as coiled springs or the like are provided for normally and yieldingly holding the respective teeth 47 into engagement with the ratchet wheels. One extremity of the spring 48 is adapted to be seated within the dog, and the other extremity has engagement with an adjustable member 49 which acts as a closure for the recesses 45 and has engagement with the respective support 44. The arms 37 and 43 are provided with notched portions 50, 51, respectively, and each of the dogs is provided with a laterally projecting lug 52, 53, adapted to engage the edge of the adjacent arm. The notches 50, 51 are each provided with an inclined face, and these faces are arranged to be opposed to each other, so that when the arms are shifted into one position to receive one of the lateral projections 52 on one of the dogs 46, the other projection 53 on the other dog 46 will be engaged by a portion of the respective arm remote from the notch to hold the dog out of engagement with its respective ratchet while the dog whose projection 52 rests within the notch 50 is adapted to engage the teeth of the ratchet 34, so that when the housings for the dogs are bodily shifted, the dog which has engagement with the ratchet teeth will impart an intermittent rotation to the respective shaft, while the other dog will be held out of engagement with its respective ratchet until the arms 37, 43 are shifted in the opposite direction.

The housings for the dogs are spaced from each other as shown more clearly in Figs. 6 and 7 of the drawings, and are connected to move in unison by reason of a suitable connecting member 54, which has a loose connection 55 with the housings or supports 44. The connecting member 54 is provided with an aperture 56 passing therethrough, and the opposite walls of the aperture are provided with reduced portions 57 to form bearings for the rounded faces 58 of an arm 59, which latter is connected to the free extremity of the rock shaft 27, so that when the shaft 27 is rocked in the manner set forth, the arm 59 will rock the supports 44 about their respective bearings to move the pawls or dogs 46 with respect to their coöperating ratchets to operate the latter.

Journaled to the support 25 adjacent one of the shafts 32, 38, preferably the shaft 38, is a gear wheel 60 which meshes with the gear wheel 41, and secured to the gear wheel 60 is a gear wheel 61 which meshes with the gear 39. With this improved construction it will be apparent that when the ratchet wheel 34 is operated in the manner set forth by its respective dog 46 when the dog 46 of the other ratchet is rendered inactive the shaft 32 will be rotated, which in turn will rotate the shaft 38 in the opposite direction, but when power is applied to the shaft 38 by shifting the arms 37, 43, to render active the dog 46 which coöperates with the ratchet 42, and the other ratchet mechanism inactive it will be apparent that the shafts 32, 38 will both be rotated, but the direction of rotation will be opposed to the direction of rotation to that when the power is applied to the shaft 32.

A suitable elastic member 62 is provided for moving the arm 59 in the opposite direction, or for maintaining the anti-friction roller 29 in engagement with the cam 30. One extremity of this elastic member is preferably connected to the arm 59, and the other extremity to a suitable projection 63 on the support 25, and an adjustable screw bolt 64 may be provided for limiting the movement of the arm 59 under the influence of the elastic member 62, and this elastic member 62, together with the bolt 64, may serve to take up the wear of the coöperating parts. Secured to the frame work of the machine is an additional support 65, which is provided with a recess or aperture 66 adapted to receive a projection 67 on a bearing 68. The projection 67 is preferably hollow, as shown more clearly in Fig. 11, and seated within the hollow portion thereof is an elastic member 69, one extremity of which extends beyond the projection 67 and has engagement with an adjustable member 70 supported by the support 65, whereby the tension of the elastic member 69 may be varied. The bearing 68 is provided with a suitable guide 71, and journaled therein is a stub-shaft 72, the extremities of which project beyond the bearing 68. The bearing 68 is arranged in proximity to the shaft 38, and one extremity of the shaft 72 is connected to the free extremity of the shaft 38 by means of a suitable universal connection comprising collars 73 pivotally secured to the ends of the respective shafts, and the connecting link or member 74, so that when the shaft 38 is rotated, the shaft 72 will also be rotated. Secured to the opposite end of the shaft 72 and beyond the bearing 68 is a feed wheel 75 which is preferably provided with a milled periphery.

The projection 67 on the bearing 68 is provided with a shoulder 77, preferably located within the support 65, and journaled in the support is one extremity of a rock shaft 78, and secured to said extremity is a shouldered cam 79 which is adapted to coöperate with the shoulder 77 to raise the bearing 68 and the feed wheel 75 against the tension of the elastic member 69 and hold the same elevated to permit the work to be properly positioned upon the support in a manner to be set forth. This rock shaft 78 is provided with an operating handle 80 which is located in any suitable or convenient position, whereby the feed wheel 75 may be raised and lowered at the will of the operator. The support 65 is also provided with a bearing 81 which is disposed in line with the sleeve 36, and journaled in and passing through said bearing 81 is a rock shaft 82, one extremity of which projects into and is secured to the sleeve 36, so that when the shaft 82 is rocked in its bearings, the arm 37 which is secured to the sleeve 36 will be rocked about its point of pivotal support to move the respective dog 46 out of operative position, or to permit the same to assume an operative position, according to the direction of rotation of the sleeve, and at the same time will shift the arm 43 in the same direction as the arm 37 is shifted through the medium of the connecting link 44ª. A suitable handle 83 may be provided for rocking the shaft 82.

It is thought that the operation of this portion of the mechanism will be clearly apparent from the foregoing description, but briefly stated, it is as follows: The shaft 27 is rocked in its bearings through the medium of the cam 30, crank arm 28 and the elastic member 62. During the vibratory movement of the arm 59, the housings containing the dogs or pawls 46 will be rocked about their respective points of pivotal support, the reduced portions 57 of the connecting member 56 coöperating with the rounded faces 58 of the arm 59 to permit such movement of the parts. By rocking the shaft 82, either one or the other of the dogs 46 may be thrown into operative position with respect to its coöperating ratchet, and as the housings are vibrated in the manner set forth, the respective shaft 32, 38 will be rotated to impart a rotary motion to the feed wheel 75, and when it is desired to reverse the operation of the feed wheel 75, the rock shaft 82 may again be operated to shift the position of the arms 37, 43 without stopping the rotation of the cam 30. When there is no work upon the support, the rock shaft 78 may be operated to raise the feed wheel 75, and when the work is in position, the shaft 78 may be rocked to lower the feed wheel into engagement with the work. It will be apparent that this improved construction is complete in itself and may be readily applied to any form of machine, and may be as readily detached.

Arranged adjacent the front of the machine, which is designated generally by the reference numeral 84 is a work support 85 which is preferably in the form of a bar, and may be of any desired length. In the present exemplification of the invention, this work support is of considerable length and extends for some distance beyond each side of the machine 84. Secured to the support 85 adjacent one extremity thereof and depending below the support is a stub-shaft or pivot bearing 86, which is journaled in a suitable support or standard 87. A suitable plate 88 may be secured to the upper face of the standard 87, and a similar plate 89 may be secured to the pivot bearing and between these plates 88, 89 are arranged suitable anti-friction devices 90 by means of which the support 85 may be freely moved about its pivot. A counterbalancing weight 91 is secured to the extremity of the support 85 adjacent the standard 87, and the free extremity 92 of the work support is adapted to engage a similar support or standard 93 located on the opposite side of the machine. This support or standard 93 is provided with a projecting portion 94 having an inclined or rounded upper face 95 which is adapted to be engaged by the extremity 92 of the work support when the latter is moved into an operative position, so as to direct the extremity into a position to be engaged by a latch 96 which is pivotally supported intermediate its ends, as at 97, to the standard 93, and an elastic member 98 is provided for holding the latch in an operative position. A yielding member 99 is provided in the upright or standard 93 which is held projected into the path of movement of the extremity 92 of the work support 85 by means of an elastic member 100, and is adapted to be moved against the tension of the elastic member when the work support is in engagement therewith. When the latch 96 is rocked to release the work support, the elastic member 100 is adapted to project the member 99 against the work support to force the free end thereof away from the support or standard 93 to move the support about its pivot 86.

The work support 85 is of any desired width, but of a width not less than the width of the feed wheel 75, and a portion thereof is arranged beneath the feed wheel 75. If desired, suitable anti-friction or supporting rollers 101 may be journaled in the work support 85 adjacent the feed wheel 75 to prevent the material from being torn, by friction, as the latter is moved along the work support under the feed wheel. If desired, a suitable supplemental support may be provided for increasing the width of the main support 85 to accommodate boxes or work of varying widths. This supplemental support 102 may be adjustably supported by the main support 85 in any desired or suitable manner, preferably by means of a bracket 103 having spaced arms 104, 105. The arm 104 is adapted to rest upon a suitable projection 106 on the main support 85 below the face upon which the work rests, and may be removably secured to the projection 106 by means of suitable fastening devices 107, such as screws or the like. Pivotally supported adjacent the extremities of the arm 104 and by one extremity thereof are two arms 108, 109. One of these arms 109 is secured adjacent the arm 104, and the other adjacent the arm 105 of the bracket, and extending toward each other to cross at points intermediate their ends, and these arms are connected at their point of crossing by means of a suitable tie bolt 110 which passes through suitable slots 111 in the arms and suitable clips 112 engaging the faces of the arms. The free extremity of the arms 108, 109 are adjustably secured as at 113, to a connecting member 114, which latter is provided with upwardly extending ears or extensions 115, to which the supplemental support 102 is secured. Passing through the main support 85 and adjacent the arm 105 of the bracket 103, are suitable adjusting screws or bolts 116, by means of which the lower extremity of the bracket 103 may be adjusted with respect to the support 85, to properly position the supplemental support 102 to hold the work level.

With this improved construction of gage or supplemental support it will be apparent that by loosening the fastening bolt 110, the arms 108, 109 will act in the nature of a lazy-tongs, and the supplemental support 102 may be adjusted toward or from the main support 85 to accommodate work of varying widths, and when so adjusted the parts may be held in their adjusted position by tightening the bolt 110, as the slots 111 in the arms 108, 109 will permit the supplemental support 102 to be thus adjusted.

In order that the invention might be fully understood the details of the foregoing embodiment thereof have been thus specifically described, but

What I claim as new is:

1. In a machine of the character described, the combination of a work support, a pair of operating shafts, a pawl and ratchet mechanism operatively connected to each of the shafts, a common means operatively related to the pawls for oscillating the pawls to rotate the shafts, work feeding means operatively connected to one of the shafts and controlled by said shafts, means for moving the work feeding means into and out of engagement with the work, and means for simultaneously throwing one of the pawls out of operative position and for positioning the other pawl to assume an operative position for controlling the direction of rotation of the work-feeding means.

2. In a machine of the character described, the combination of a work support, a pair of operating shafts, a pawl and ratchet mechanism operatively connected to each of the shafts, a common means operatively related to the pawls for simultaneously rocking the same to rotate the shafts, a feed wheel, means for supporting the wheel above the work support, a flexible connection between the wheel and one of the said shafts, means for simultaneously throwing one of the pawls out of operative position and for permitting the other pawl to assume an operative position for controlling the direction of rotation of the feed wheel, and means for lowering the feed wheel with respect to the operating shaft and into engagement with the work.

3. In a machine of the character described, the combination of a work support, a pair of operating shafts, a pawl and ratchet mechanism operatively connected to each of the shafts, a common means operatively related to the pawl for simultaneously rocking the pawls to rotate the shafts, a feed wheel, a support for the wheel, a flexible connection between the wheel and one of the shafts, a guide for the wheel support, elastic means tending normally to hold the wheel in engagement with the work support, means for simultaneously throwing one of the pawls out of operative position and for permitting the other pawl to assume an operative position for controlling the direction of rotation of the feed wheel, and means for raising and holding the feed wheel out of engagement with the work and against the tension of the said elastic means.

4. In a machine of the character described, the combination of a work support, a pair of operating shafts, a pawl and ratchet mechanism operatively connected to each of the shafts, a common means operatively related to the pawls for simultaneously rocking the pawls to rotate the shafts, a feed wheel, a support for the wheel, a flexible connection between the wheel and one of the shafts, a guide for the wheel support, elastic means tending normally to hold the wheel in engagement with the work support, means for simultaneously throwing one of the pawls out of operative position and for permitting the other pawl to assume an operative position for controlling the direction of rotation of the feed wheel, means for raising and holding the feed wheel out of engagement with the work and against the tension of the said elastic means, and means for varying the tension of the said elastic means.

5. A machine of the character described, including in combination a pair of shafts, a ratchet wheel operatively connected to each of the shafts for rotating the same, a pawl coöperating with each of the ratchets, a pivotally mounted support for the pawls, means for rocking the pawls to shift the ratchets, a work feed wheel having operative connection with one of the shafts, means for simultaneously shifting one of the pawls out of operative position and for permitting the other pawl to assume an operative position to control the direction of rotation of the said work feed wheel, and means for shifting the latter into and out of engagement with the work.

6. A machine of the character described including in combination a pair of shafts, a ratchet wheel operatively connected to each of the shafts for rotating the same, a pawl coöperating with each of the ratchets, a pivotally mounted support for the pawls, means for rocking the pawls to shift the ratchets, a work feed wheel having operative connection with one of the shafts, a member fixed with relation to each of the pawls for controlling the respective pawls, a connection between said members, means for shifting one of the said members to simultaneously shift the other member to throw one of the pawls out of operative position and for permitting the other pawl to assume an operative position for controlling the direction of rotation of the work feed wheel, and means for shifting the work feed wheel into and out of engagement with the work.

7. A machine of the character described including in combination a pair of operating shafts, means operatively connecting said shafts, a ratchet wheel operatively connected to each of the shafts, a pawl coöperating with each of the ratchets, a pivotally mounted support for each of the pawls, a connecting member between the supports, said member being provided with spaced oppositely disposed reduced bearing points, a member projecting between the bearings and having rounded faces adapted to engage the bearings, means for imparting movement to the last said member to rock the pawl support to rotate the shafts, and means for simultaneously throwing one of the pawls out of operative position and for permitting the other pawl to assume an operative position for controlling the direction of rotation of the feed wheel.

8. A machine of the character described including in combination a pair of operating shafts, means operatively connecting said shafts, a ratchet wheel operatively connected to each of the shafts, a pawl coöperating with each of the ratchets, a pivotally mounted support for each of the pawls, a connecting member between the supports, said member being provided with spaced oppositely disposed reduced bearing points, a member projecting between the bearings and having rounded faces adapted to engage the bearings, means for imparting movement to the last said member to rock the pawl support to rotate the shafts, means for limiting the movement of said member in one direction, and means for simultaneously throwing one of the pawls out of operative position and for permitting the other pawl to assume an operative position for controlling the direction of rotation of the feed wheel.

9. A machine of the character described including in combination a pair of shafts operatively connected, a ratchet wheel operatively connected to each of the shafts for rotating the same, a support pivotally mounted with respect to each of the shafts, a pawl mounted upon said support and adapted to engage the respective ratchet, means for rocking the support for rotating the shafts, a pivoted member fixed with relation to each of the pawls and having an operative engagement with the respective pawls for controlling the latter, a connection between said members, a feed wheel operatively connected with one of the shafts, means for shifting said members about their pivots for throwing one of the pawls out of operative position and for permitting the other pawl to assume an operative position for controlling the direction of rotation of the feed wheel and means for shifting said feed wheel into and out of engagement with the work.

10. A machine of the character described including in combination a work support, a feed wheel, a shaft to which said wheel is secured, a bearing for the shaft, a support with which the bearing has a sliding connection, an elastic member disposed between the bearing and the last said support for normally holding the feed wheel in close proximity to the work support, a guide for the bearing, means for moving the feed wheel away from the work support and against the tension of the said holding means, a power shaft fixed with relation to the work support, and a flexible connection between the said shafts.

11. A machine of the character described including in combination a work support, a feed wheel, a shaft to which said wheel is secured, a bearing for the shaft, a support with which the bearing has a sliding connection, an elastic member disposed between the bearing and the last said support for normally holding the feed wheel in close proximity to the work support, a guide for the bearing, means for moving the feed wheel away from the work support and against the tension of the said holding means, a pair of power shafts, an operative connection between said shafts, an operative means for each of the shafts, a common means for imparting motion to said operating means, a universal connection between one of said power shafts and the feed wheel shaft, and means for rendering one of the said operating means active and the other inactive to control the direction of rotation of the feed wheel shaft.

12. A work support for stapling machines and the like comprising an upright, a counterbalanced arm pivotally supported by the upright and for lateral movement, a second upright arm spaced from the first said upright and adapted to be engaged by the free end of the arm, and a catch supported by one of the uprights and adapted to engage the arm for locking the same in operative position.

13. A work support for stapling machines and the like comprising an upright, a counterbalanced arm pivotally supported by the upright and for lateral movement, a second upright spaced from the first said upright and adapted to be engaged by the free end of the arm, a catch supported by one of the uprights and adapted to engage the arm for locking the same in operative position, and means for automatically shifting the arm about its pivot when the catch is released.

14. A work support for stapling machines and the like comprising an upright, a counterbalanced arm pivotally supported by the upright and for lateral movement, a second upright spaced from the first said upright, and provided with a support upon which the free extremity of the arm is adapted to rest, means for directing the free end of the arm upon the support and a catch for automatically locking the arm in operative position.

15. A work support for stapling machines and the like comprising an upright, a counterbalanced arm pivotally supported by the upright and for lateral movement, a second upright spaced from the first said upright and provided with a support upon which the free extremity of the arm is adapted to rest, said upright being provided with an extension having an inclined face arranged in the path of movement of the arm and adapted to be engaged by the arm to direct the latter upon the support, and means for automatically locking the arm in an operative position.

16. A work support for stapling machines and the like, comprising a pivotally mounted main supporting arm, and a supplemental support spaced from and parallel with the arm and mounted to partake of the movement of the arm, and means for laterally adjusting the said supplemental support with respect to the arm.

17. A support for stapling machines and the like comprising a pivotally mounted main supporting arm, a combined supplemental work support and gage, a bracket, a lazy-tongs connection between the bracket and the said supplemental support, all of the aforesaid parts partaking of the movement of the arm, and means detachably connecting the bracket to the arm.

18. A support for stapling machines and the like comprising a pivotally mounted main supporting arm, a combined supplemental work support and gage, a bracket, a lazy-tongs connection between the bracket and the said supplemental support, means for removably securing the bracket to the arm, and means for raising and lowering the said supplemental support with respect to the main support.

19. A machine of the character described embodying a rotary work feeder, two sets of mechanisms for operating the work feeder and for controlling the direction of feeding movement of the latter, means common to both of said sets of mechanisms for operating the latter, and means for controlling the operation of said mechanisms.

20. A machine of the character described embodying a work feeder, two sets of mechanisms for operating the work feeder and for controlling the direction of feeding movement of the latter, means common to both of said sets of mechanisms for operating the latter, means for moving the work feeder into and out of engagement with the work, and means for controlling the operation of said mechanisms.

21. A machine of the character described embodying a rotary work feeder, two sets of mechanisms for operating the work feeder and for controlling the direction of feeding movement of the latter, means common to both of said sets of mechanisms for operating the latter, means for moving the work feeder into and out of engagement with the work, and means for controlling the operation of said mechanisms.

22. A machine of the character described embodying a rotary work feeder, two sets of mechanisms for operating the work feeder and for controlling the direction of feeding movement of the latter, means common to both of said sets of mechanisms for operating the latter, and means for rendering one of said sets of mechanisms active and the other inactive at will.

In testimony whereof I have signed my name to this specification, in the presence of two subscribing witnesses, on this 27th day of June A. D. 1908.

WILLIAM OSTERHOLM.

Witnesses:
J. H. JOCHUM, Jr.,
C. H. SEEM.